Figure 1A:
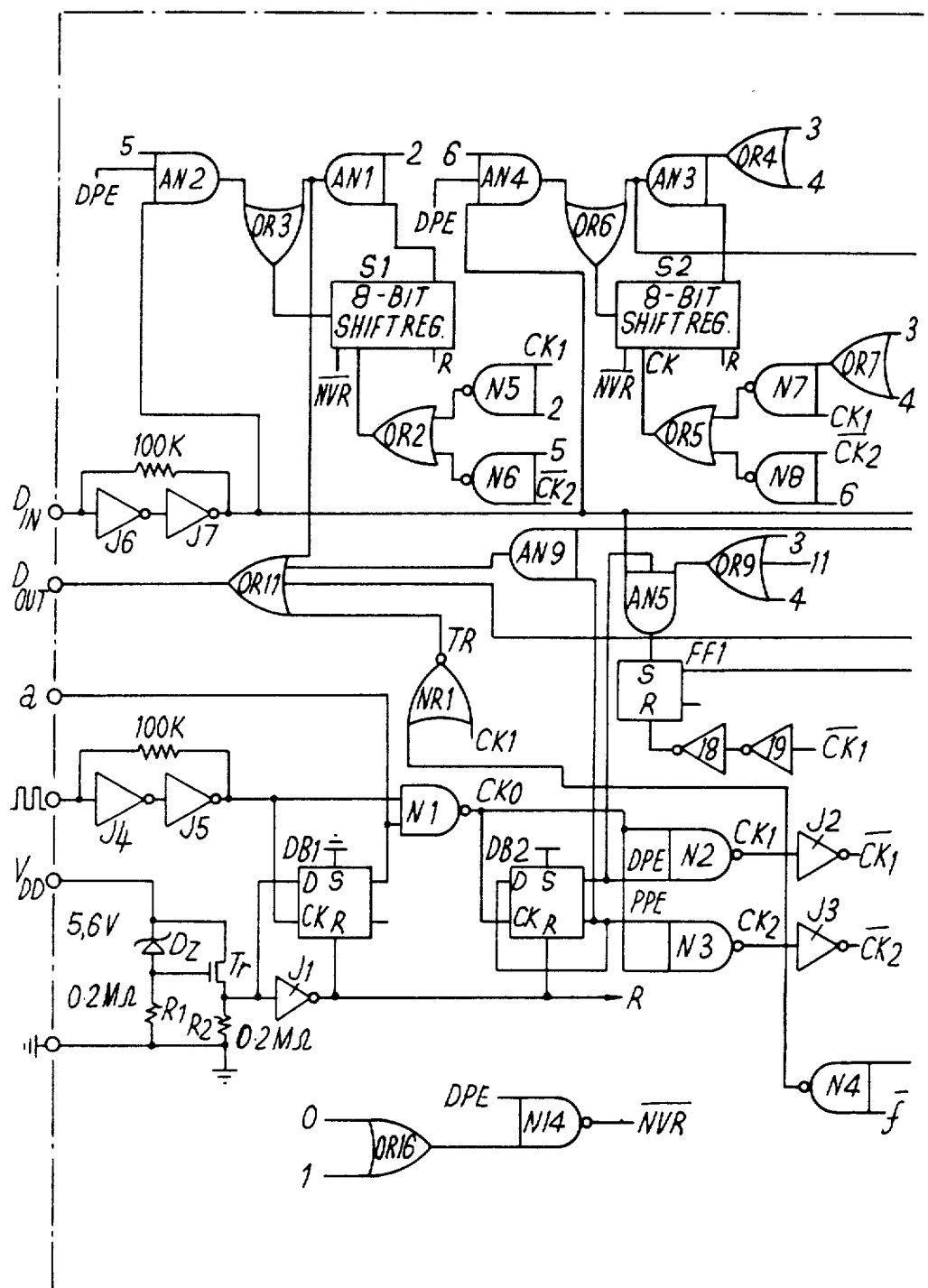

United States Patent [19]

Halpern

[11] Patent Number: 4,499,556

[45] Date of Patent: Feb. 12, 1985

[54] SECURITY ARRANGEMENTS IN DATA TRANSFER EQUIPMENT

[76] Inventor: John W. Halpern, 14 Belsize Park Gardens, London N.W.3, England

[21] Appl. No.: 184,377

[22] Filed: Sep. 5, 1980

[30] Foreign Application Priority Data

Sep. 7, 1979 [GB] United Kingdom ............... 7931208

[51] Int. Cl.³ .......................................... G06K 19/06
[52] U.S. Cl. ................................ 364/900; 235/487; 364/200; 178/22.08
[58] Field of Search ............... 364/900, 200; 235/419, 235/487, 488, 379; 179/2 DP, 2 CA; 178/22.01, 22.09, 22.02, 22.08

[56] References Cited

U.S. PATENT DOCUMENTS

| | | | |
|---|---|---|---|
| 3,798,605 | 3/1974 | Feistel | 364/200 |
| 3,906,460 | 9/1975 | Halpern | 364/900 |
| 3,971,916 | 7/1976 | Moreno | 364/200 |
| 3,984,637 | 10/1976 | Caudill et al. | 364/200 |
| 4,001,550 | 1/1977 | Schatz | 235/379 |
| 4,007,355 | 2/1977 | Moreno | 235/379 |
| 4,138,735 | 2/1979 | Allocca et al. | 364/900 |
| 4,211,919 | 7/1980 | Ugon | 235/488 |
| 4,295,041 | 10/1981 | Ugon | 235/488 |
| 4,323,921 | 4/1982 | Guillou | 178/22.08 |

Primary Examiner—Jerry Smith
Assistant Examiner—Michael R. Fleming
Attorney, Agent, or Firm—Townsend and Townsend

[57] ABSTRACT

In equipment which comprises a storage station or portable data carrier holding data and a control station for interaction with the storage station to alter the stored data, for example telephone equipment in which the user carries a pay token for use in pay phone equipment which changes the value recorded in the token in accordance with the call made, a security check operates by means of a reference signal and a test signal held in the storage station, the reference signal selecting a corresponding test signal in the control station for comparison with that of the storage station. The control station in one mode will present a valid test signal for comparison and in another mode will present an invalid test signal. These modes may occur in different sequences and the control station evaluates the responses of the storage station to both valid and invalid test signals before allowing use of the data held by the storage station. After each transaction the reference signal and test signal held by the storage station are replaced by new signals generated by the control station. The test signals held by the control station are periodically changed so that some are available only for checking and not for re-use while others are no longer available and a storage station holding an out-of-date test signal therefore cannot be used.

22 Claims, 9 Drawing Figures

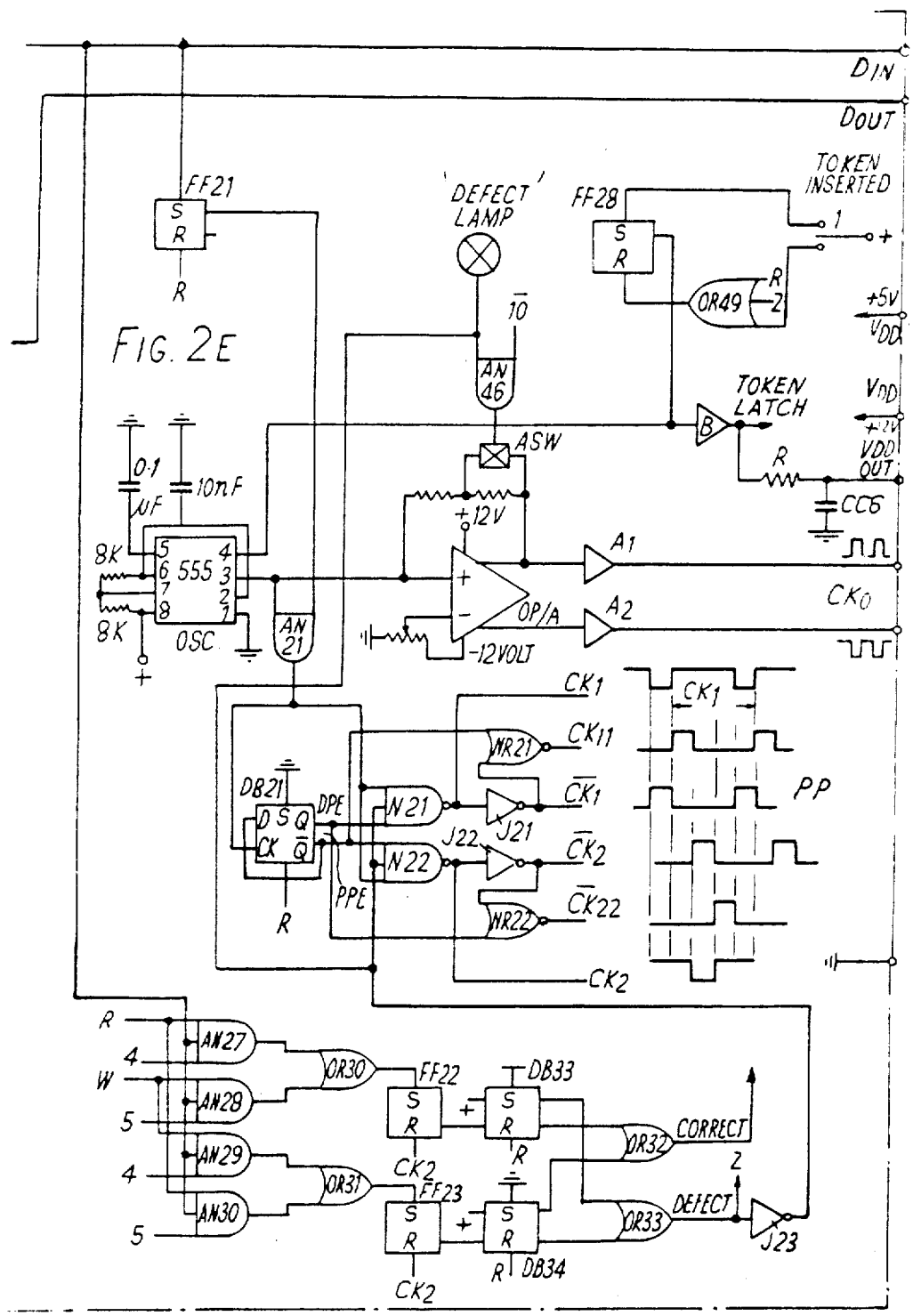

SECURITY ARRANGEMENTS IN DATA TRANSFER EQUIPMENT

The present invention relates to data transfer equipment comprising at least one storage station for storing data and at least one control station for interaction with the storage station to alter the stored data.

The storage stations of such equipment may be in the form of portable data-carrying components in which value data are stored. For example in a telephone system the user may carry a pay token containing stored value data representing the value of telephone calls which may be made by inserting the token in a telephone apparatus. In any such equipment it is important to protect the integrity of the rightfully stored data in the data carrying component and for preventing various types of fraudulent use of the equipment or component.

A basic principle for data protection has been described by the inventor in his U.S. Pat. No. 3,906,460 and this principle is retained also in this patent application; its essence is the incorporation of a data register circuit in the portable component, from which register data cannot be read out. They can only be internally compared with data (so-called check data) which must be entered at the right moment of the total duty cycle and presented to the data component. If the comparison is unsuccessful, that is, if the number held by the token and the number presented to the token, are different, no data may be read out or alternatively no data may be modified or changed in the data component. Also, the number of unsuccessful tests was limited by a so-called fraud counter within the circuit of the data component.

While this principle is entirely effective as long as genuine on-person data components are used, the method has two weaknesses:

(a) If the entire system operates with only one check number, say, a 12 digit word which remains the same for the entire life of the system which may be well over 15 years, the possibility exists that the check number may be revealed to, or discovered by, persons with fraudulent intent. If that happened, the integrity of the entire system could be put in question.

(b) It may also be that an imitation data carrier could be constructed by persons skilled in hybrid assembly who might succeed in devising a circuit which imitates the behaviour of a genuine circuit yet in reality avoids the constraining factors which force a genuine component to provide access to services only when it is properly loaded.

The present invention provides several remedies of which the most important ones are:

(1) In place of only one check number there is, on principle, a large number of possible check numbers of which a smaller number, say 3 to 6, are elected to be in 'active use', at any one time. Assume that the number in 'active' use is 4. Any particular portable data component can contain only one of these numbers but it holds also reference data which are read out initially telling the data processing unit which of the four numbers are held by the token or data component. Each time a data component interfaces with a data station, both the reference number and the actual check number are changed by picking one other of the four 'active' check numbers in use.

From time to time, say every two weeks, one of the four numbers is put into 'inactive' state or reserve state while an entirely new number is added which is associated with a particular reference number. A data carrier which happens to be loaded with a test number now in reserve state will still be able to make a successful comparison but when then the reference and test numbers are re-loaded into the component they are no longer loaded with a reserve number but only with a number in 'active' rotation. So, the inactive numbers are gradually taken out of all the tokens or data components in circulation. After another two weeks (or two months, etc.) one of the inactive numbers is altogether deleted from its reference position. It vacates this position so that it may be occupied by the newest addition to the 'active' numbers. If after the requisite time lapse any token in circulation still has a test number identical to the deleted number in one of the reference position, it will not be accepted and the owner will be told (by display) to present the token for renewal at a certain central issuing station. Such cases may in practice occur when a token, normally used at least several times a week, remained unused for a period of, say, 6 weeks. In that case, the need for having it activated again may not appear unreasonable being, as it would be, a part in the general security system.

(2) Another, equally vital improvement consists in the idea that presenting to the data component a genuine test number and observing the result is not sufficient; one must also be able to observe the components behaviour when a wrong test number is presented to it; but even this second condition is not sufficient in order to anticipate possibly simulated responses from the token; the additional condition must be made that checks are unpredictable. This means that the data processing equipment station with which a portable data carrier is brought to interact, is required to generate an unpredictable sequence of correct and false test numbers.

Thus in accordance with one aspect of the invention there is provided data transfer equipment comprising at least one storage station for storing data and at least one control station for interaction with the storage station to alter the stored data, the storage station including memory means for holding a reference signal and a test signal and the control station including selection means responsive to a reference signal from the storage station to select a test signal stored by the control station and transfer it to the storage station for comparison with the storage-station test signal, the result of the comparison permitting or inhibiting alteration of the stored data in the storage station, wherein the control station comprises a plurality of memory locations into which different test signals can be entered at different times, said memory locations being addressable by the said reference signal to effect the said comparison and including at any one time first and second groups of locations, the control station further including means for substituting a test signal held in one of said first group of memory locations and a reference signal representing the address of said one location for the test signal and reference signal previously held by the memory means in the storage station.

In accordance with a second aspect of the invention there is provided data transfer equipment comprising at least one storage station for storing data and at least one control station for interaction with the storage station to alter the stored data, the storage station including memory means for holding a reference signal and a test signal and the control station including means responsive to a reference signal from the storage station to select a test signal held by the control station and transfer it to the storage station for comparison with the storage-station test signal, the result of the comparison permitting or inhibiting alteration of the stored data in the storage station, wherein the control station comprises at least two memory locations in which different test signals are held and means for presenting the two test signals to the storage station in an unpredictable sequence for comparison with the storage-station test signal, the storage station including means for generating different responses to comparison of the storage-station test signal with a similar and a dis-similar test signal, and the control station including evaluating means for determining whether these responses are obtained in the correct sequence or the response is defective.

Figure 1B:
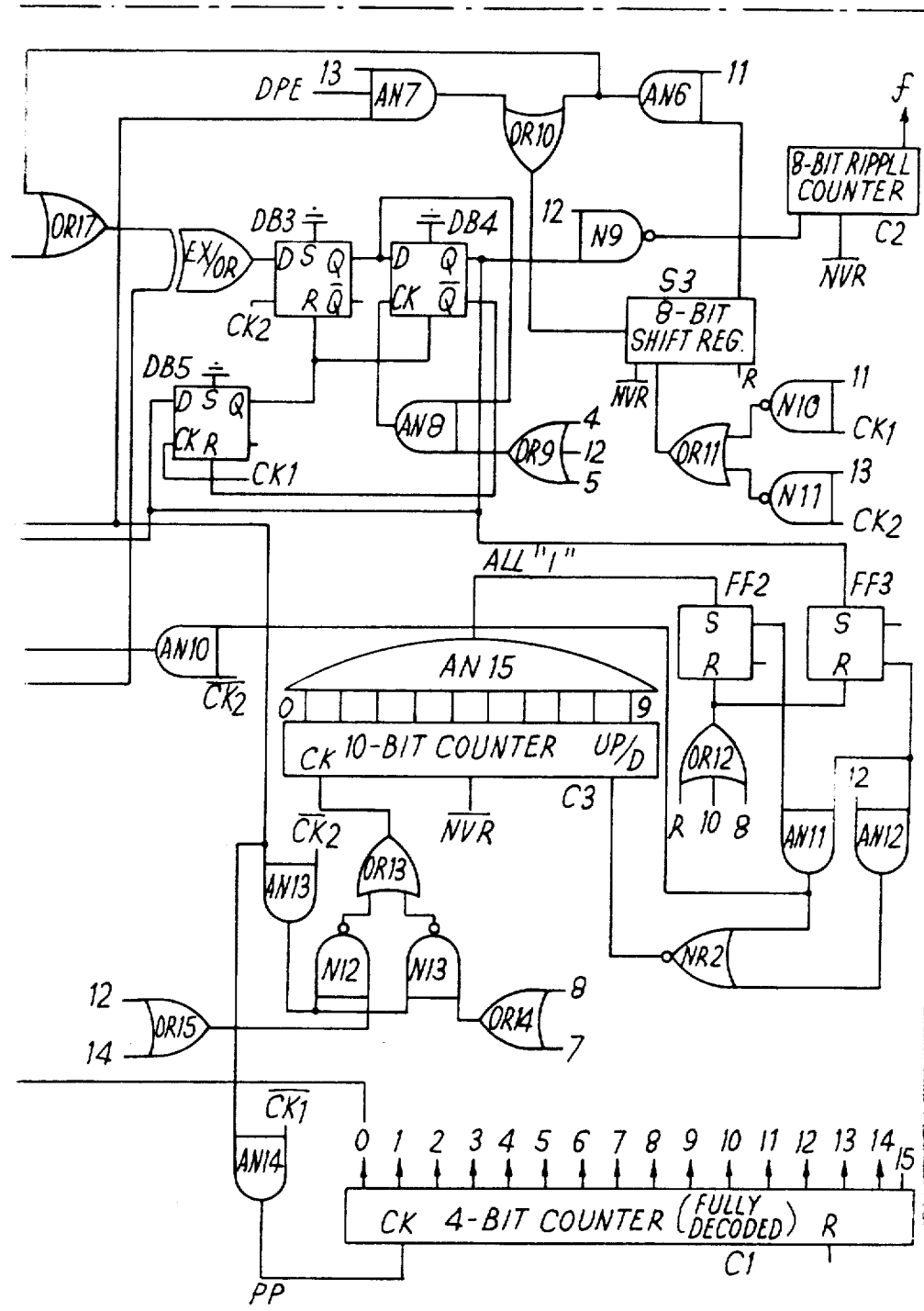
Figure 2:
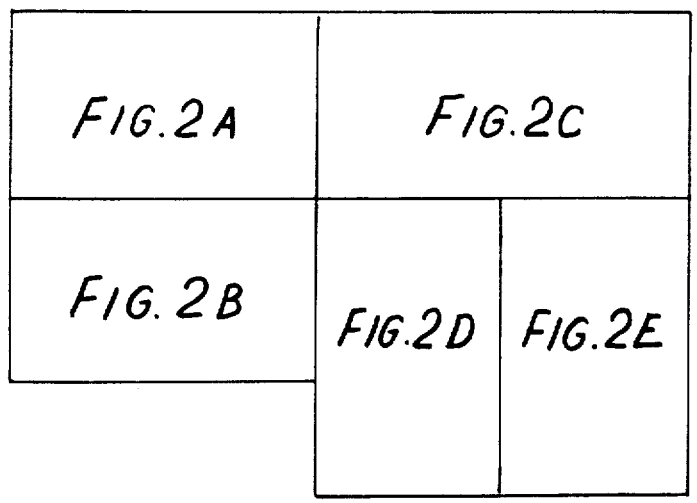
Figure 2A:
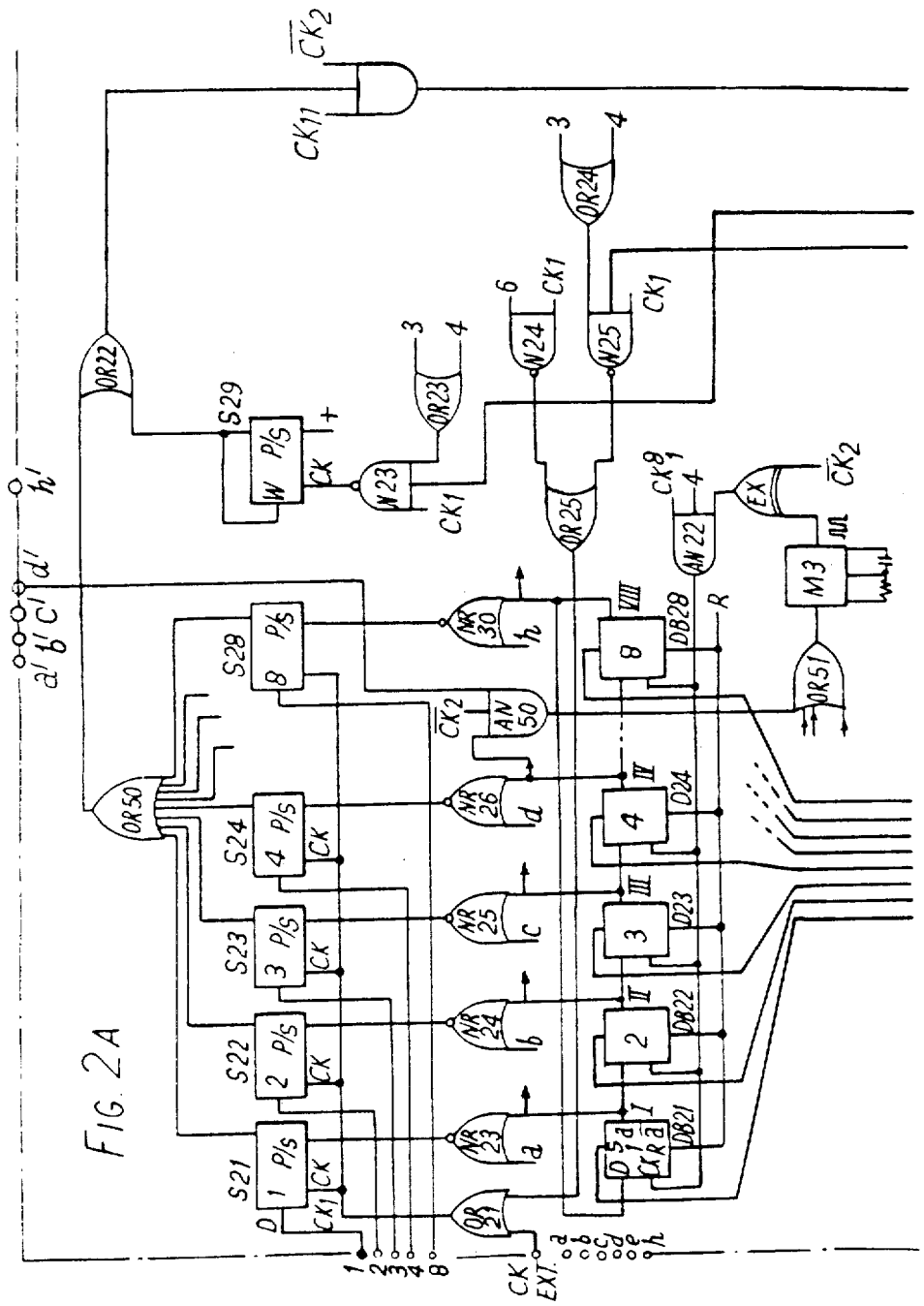
Figure 2B:
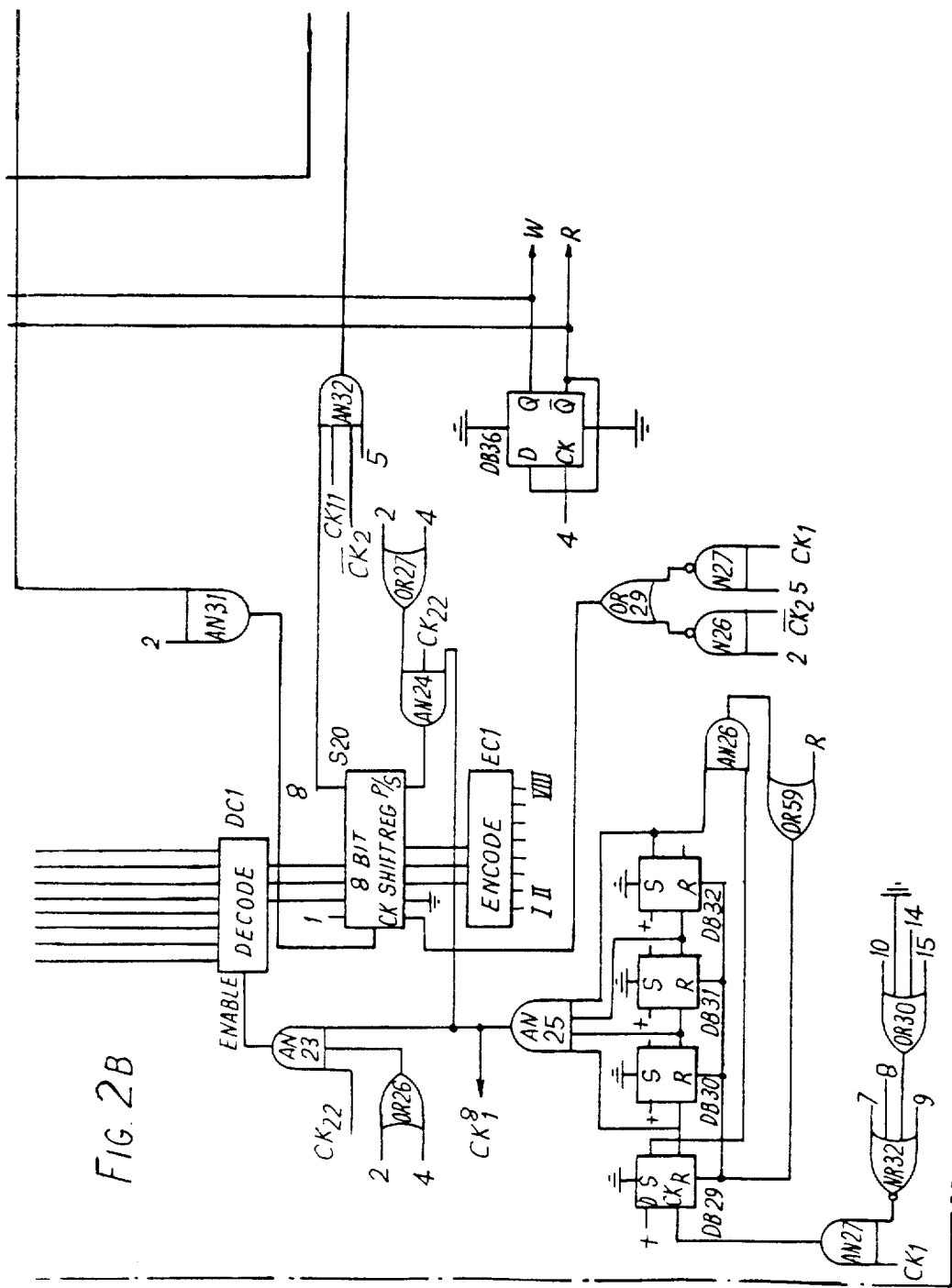
Figure 2C:
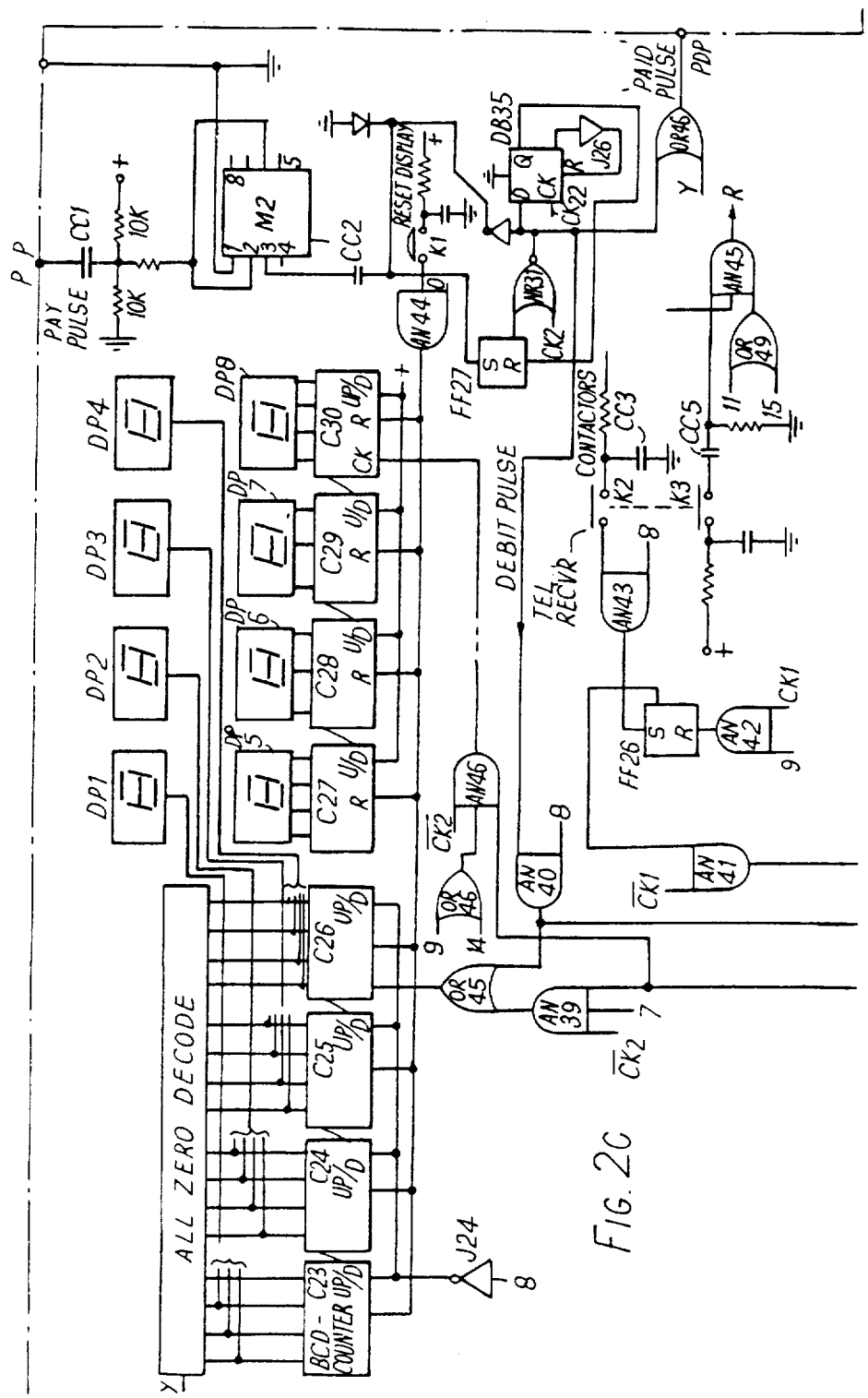
Figure 2D:
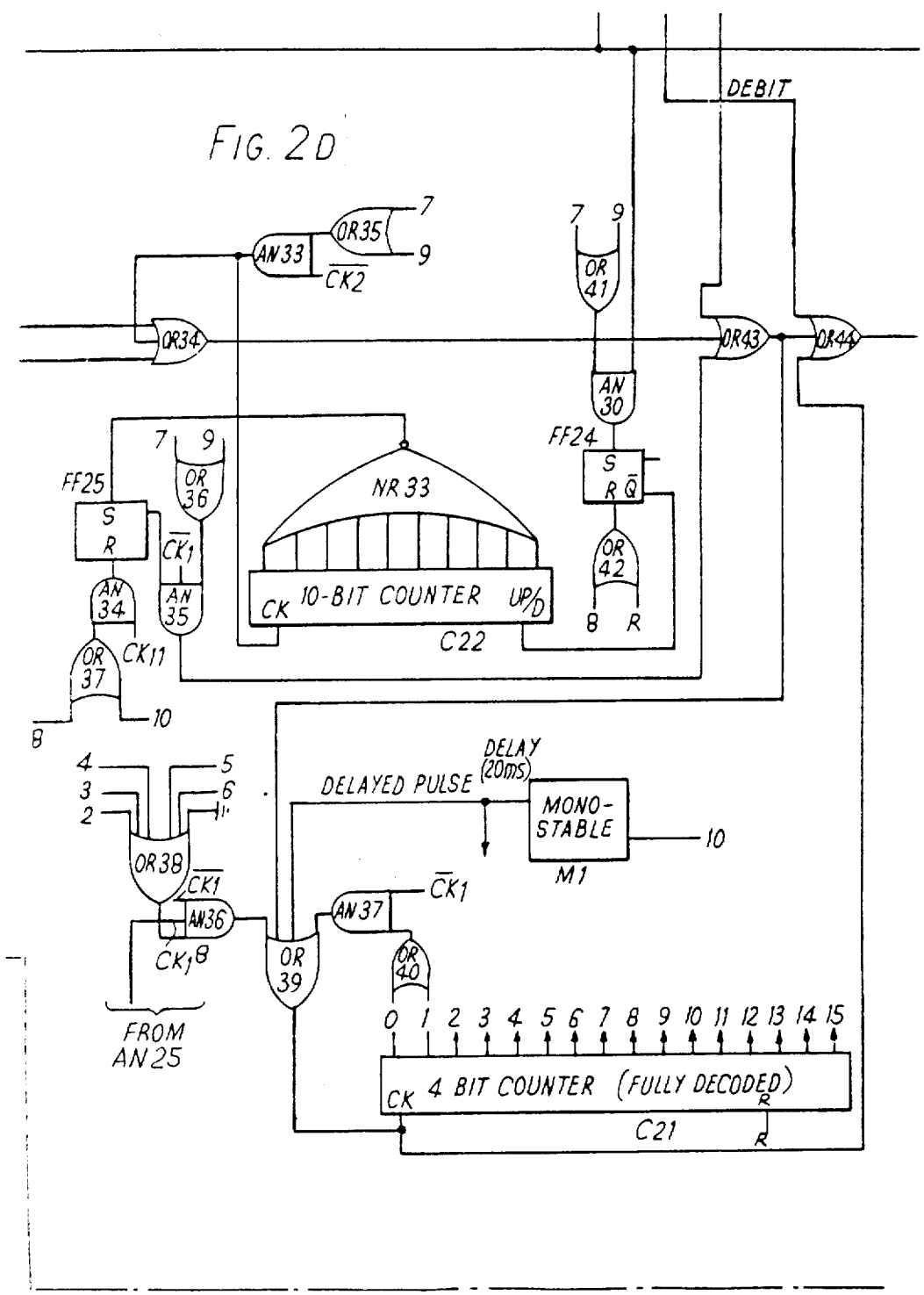
Figure 3:
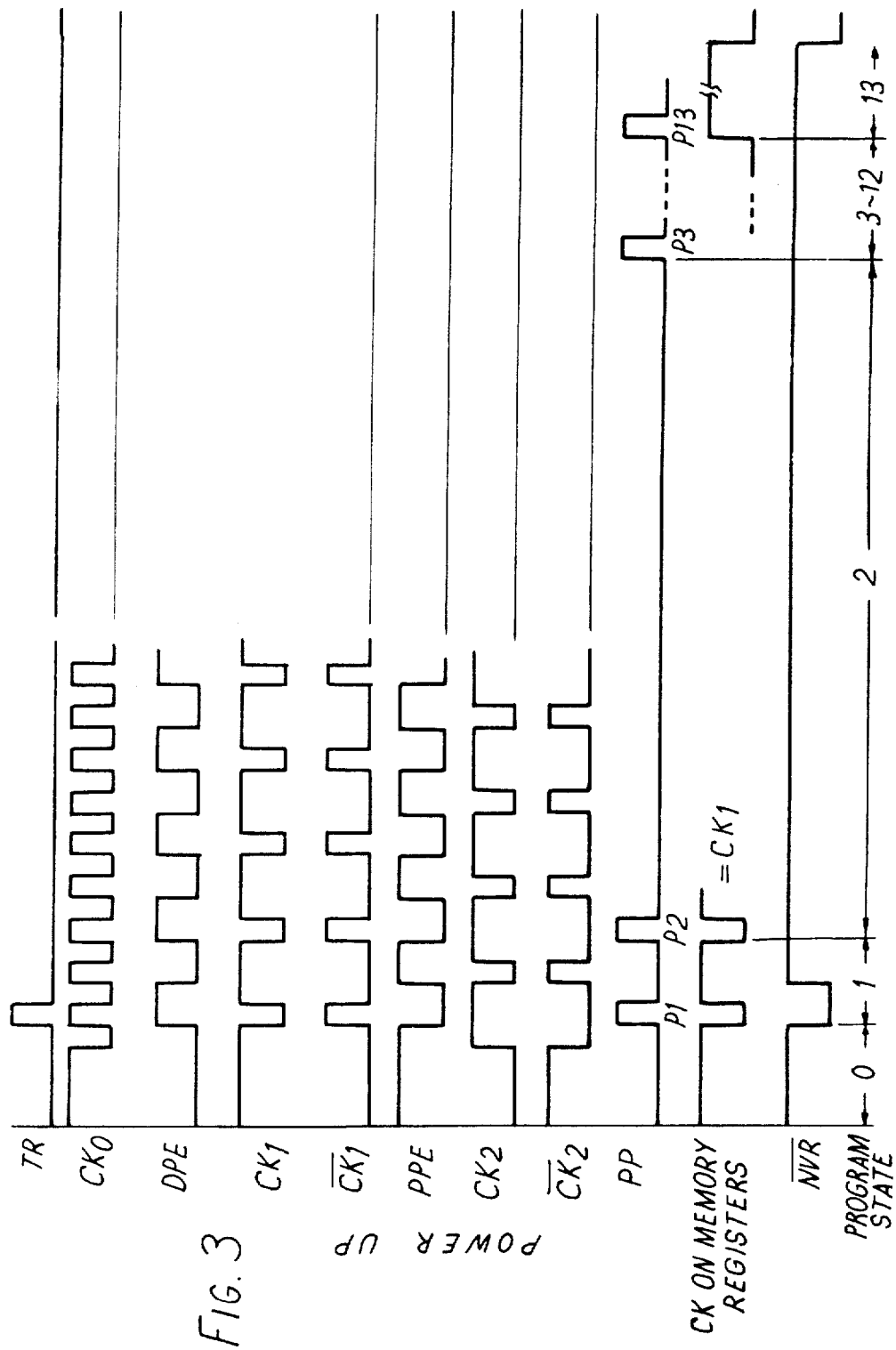

The invention will now be described in more detail with the aid of an example illustrated in the accompanying drawings, in which:

FIGS. 1A and 1B taken together form FIG. 1 which is a circuit logic diagram for a data-carrying component or token to be used in a system in accordance with the invention, FIGS. 2A to 2E put together as shown in FIG. 2 form a circuit logic diagram for a control station to be used with the token of FIG. 1, and FIG. 3 is a diagram of operating pulses occurring at different points in the circuits of FIGS. 1 and 2 showing their timing relative to one another and the programme sections controlled by the operating pulses.

The system to be described is in the form of a pay phone station or public telephone box forming the control station and a pay token forming the data-carrying component. A user carries the pay token, which stores a value signal representative of payment made for use of the token, and inserts the pay token in the telephone box when he whishes to make a call. The equipment in the telephone box checks the validity of the pay token and the availability of value in the token before permitting the call and then changes the value signal in accordance with the cost of the call which is made.

The coupling between the pay token and the control station may be inductive, as described in my above referenced U.S. Pat. No. 3,904,460, but could equally well be by direct electrical contact between spring-loaded needle contactors and contact pads. It is assumed for purposes of the present description that the contacts are of this latter kind and serve to connect the terminals at the left hand side of FIG. 1 with those at the right hand side of FIG. 2. In making these connections $D_{in}$ and $D_{out}$ of FIG. 1 are connected respectively to $D_{out}$ and $D_{in}$ of FIG. 2.

A duty cycle commences when the token is inserted and sets FF28 in FIG. 2, thereby operating the token latch and causing operating voltage $V_{DD}$ to be switched on. The voltage will rise less steeply in the circuit of FIG. 1 than in the control station circuit of FIG. 2 because of the provision of a small capacitor CC6 which is so dimensioned that 90% of the applied voltage is charged over resistor R within 12 ms. The purpose of the Zener Diode $D_z$ in FIG. 1 is to delay the application of a voltage to the inverter $I_1$ until the minimum safe operating voltage is reached. The output of this inverter therefore remains high and this is used as the resetting voltage R ensuring that all bistables are reset before the commencement of the duty cycle. Once the transistor Tr begins to pass current, the voltage at the D-input of bistable DB-1 rises rapidly. DB-2 is clocked giving outputs DPE (Data Pulse Enable) and PPE (Program Pulse Enable) at half the frequency of $CK_o$ (output of the oscillator in FIG. 2). Therefrom are derived the pulse parameters $CK_1$, $CK_2$, $\overline{CK}_1$ and $\overline{CK}_2$ (see also pulse diagram FIG. 3).

The circuit FIG. 1 is made up of bistables, gates, three counters (C1, C2 and C3) and three shift registers (S1 S2 and S3). To begin with the Program Counter C1 is in the reset condition which means that the decoded output '0' is at high logical level whereas decoded outputs 1 to 15 are all at a low level. The output of gate N4 is low (assuming f is high which in a valid token is the case). This permits the clock $CK_1$ to produce a positive pulse, the so-called trigger pulse TR, at the output of NR1. Applied to FIG. 2 this sets the bistable FF 21 enabling and gate AN21 and applying $CK_o$ pulses to frequency divider DB21. Therefrom result the Pulse parameters $CK_1$, $CK_{11}$, $\overline{CK}_1$, $CK_2$, $CK_{22}$, and $\overline{CK}_2$. The mutual phase relationship of these pulses is illustrated in the adjacent diagram. As the first $\overline{CK}_1$ pulse is produced, gate AN37, (FIG. 2D) enabled by the (reset) counter output 0 of Counter C21, passes on a pulse via OR39 partly to program counter C21, partly to C1 (FIG. 1). The two program counters step synchronously to Program Section '1' (henceforth referred to as PS-1). PS-1 is required solely for the purpose of recalling the inert memory data which are contained in the shift registers S1, S2, S3 and in the counters C2 and C3.

While the features of this invention are not bound up with any particular non-volatile technique, the specific example chosen is based on the non-volatile semi-conductor technology developed by Hughes Microelectronics Ltd. of Glenroth, Scotland. According to this technology, to recall to active state the dormant memory of the data structure held before the last power shutdown, the condition specified is that the following two inputs must be held at a low level for a brief moment of time: the clock input to the bistables concerned, and a non-volatile recall input labelled $\overline{NVR}$. This condition is established during PS-1 as shown in the diagram FIG. 3. $\overline{NVR}$ is produced by the combination of OR gate OR16 and Nandgate N14 (see bottom of FIG. 1).

After the recall of the memory status a further stepping pulse derives from $\overline{CK1}$ circuit FIG. 2 due to OR-40 enabling AN-37 during PS-1.

The system therefore proceeds to PS-2 in which Gate AN1 (FIG. 1A) is enabled and the 8-bit shift-register S1 is clocked out by $CK_1$ pulses and recirculates. After the end of the eighth $CK_1$ pulse, a $\overline{CK}_1$ pulse is produced at AN25 and applied through AN36 and OR39 to program counters C21 and C1, causing them to step to PS-3. During PS-2 the contents of shift register S1 are transferred to shift register S20 (FIG. 2b) by way of OR11 and AN31.

Just before the end of PS-2 a pulse coincident with $CK_{22}$ is applied to the P/S input of S20 thereby converting the data just received for parallel output presentation to the decode unit DC1 converting the binary number into unique outputs applied to bistables DB21 to DB28 respectively. Whereas the NOR gates NR23 to NR30 respectively normally have a high output so that the shift registers S21 to S28 normally are in their parallel data mode, any unique output from decoder DC1 will single out the corresponding shift-register which is then put into the serial mode.

As the program counter goes to PS-3 clock pulses applied to all the shift registers S21 to S28 will have no effect except on that one selected for serial shiftout. Its data will pass through OR 50 OR 22, 34, 43 and 44 to the Data-Out terminal and from there in FIG. 1 to And-gate AN-5 enabled by OR-9. Each high data bit sets FF-1 whose output is applied to the EX/OR gate in coincidence with data clocked out from the register S-2.

Before going further, attention must be drawn to the fact that Nandgate N25 in FIG. 2, from which the clock pulses applied to any of the registers S21 to S28, are derived, has also another enabling input that is generated by the Bistable DB 36. The same is selfcontained and remains in the last state held after a previous duty cycle until the program section '4' is reached. Then it is triggered into its other state. It thus changes state only once in the course of each duty cycle and when a new token is presented to the control station to start a new cycle, the state in which DB36 will be found is unpredictable. It can be seen from FIG. 2 that when the Q output terminal of DB 36 is high, this enables none of the shift registers S21 to S28 holding a correct test number, but it enables the CK clock input to the shift register 'W' which contains an invalid check number or 'wrong' number. When $\bar{Q}$ is high, this enables Nandgate N25 and thus the CK clock pulses to the legitimate shift registers. In program sectors 3 and 4, therefore, the correct and the false test number are presented to the portable data carrier circuit (FIG. 1) in succession. Nothing can be said about the sequence, that is, which comes first and which thereafter since this depends on the random condition of the bistable DB-36.

Assume that the wrong test number is presented first (during program section 3). The recirculating number in S-2 (FIG. 1) is serially applied to the EX/OR gate. At the same time the contents of shift register 'W' is also applied to EX/OR via OR22, OR34, AN5 and FF1. The bit-by-bit comparison is bound to show up at least one non-parity. The moment of comparison of two EX/OR input levels occurs when $CK_2$ goes high and any disparity will trigger DB-3. When PS-4 commences DB4 would then be triggered, too. This produces a short pulse on the Andgate AN-9. The pulse is passed on to the circuit of FIG. 2 and applied to the And Gates AN-27 to AN-30. Also, during PS-4 (because of DB-36 changing state), the right test number is presented for comparison and of course there will be no output from DB-3 or DB-4. (These bistables had been reset by CK-1 clock on DB-5). According to what has been said before, the responses obtained during PS-3 and PS-4 must be combined in such a way that they together verify the correctness and genuineness of the portable data carrier circuitry. This is done by means of the circuit group comprising the already cited gates AN-27 to AN-30, OR-30 and OR-31, and bistables FF-22, FF-23, and DB-33 and DB-34.

A similar combined verification results from a sequence beginning with a presentation of the right test number followed by the wrong test number. If this circuit produces a high level on the 'DEFECT' line, it stops the generation of clock pulses (except $CK_0$) by disabling N-21 and N-22. Furthermore, because of the premature termination of the duty cycle, a 12 volt pulse of at least 15 ms duration must be injected into the $V_{DD}$ supply line of the portable component. This function is also controlled by the said 'DEFECT' output by signal Z applied to OR49. Finally, a warning light is lit (Defect Lamp), and if required a printout on paper tape provides the necessary information to the operator.

If the test cycles are completed satisfactorily, the program counters are stepped on to program section 5 which is used for replacing the contents of shift register S-1, and, in this context, we are interested only in the reference number. The control Unit in the stationary data station (in our example, the public pay phone) generates a new reference number. This is done automatically, on a rotational basis. In practice, this is done by shifting the initially selected bistable of the series DB-21 to DB-28 by one position to the right after the fashion of a ripple counter. This is achieved by means of a pulse $\overline{CK}_2$ on gate AN-22 during the eighth shift pulse period. Assume that DB23 had been triggered and output III was high. Now, output IV of DB24 would be high with the commencement of pulse $\overline{CK}_2$. The output IV is now also connected to the input IV of the encoder circuit EF-1 which presents the encoded new reference number to the parallel inputs of shift register S-20. A short pulse generated by $CK_{22}$ is applied to the P/S mode control input of S-20. This places the serial number into the shift register which is then after commencement of PS-5 clocked out and received and entered into S-1 of FIG. 1. At the same time, output IV also affects the mode control of the shift registers holding valid numbers, in the case of the example, it will be that of shift-register S-24. When PS-6 commences, therefore, this new 8 bit number will be clocked out, received by S-2 and entered thereinto.

Not all the eight test numbers are in active use. A smaller number, for example only four are in 'active' use at any time. These registers can be arranged in a circle. Four of these registers carry 'active' numbers. Two positions to the left thereof carry 'semi-retired' numbers, that means they are still accepted for comparison with the test number in a portable pay token, but thereafter none of the retired numbers are used for renewal but only one of the currently 'active' numbers. Still further to the left, there are two further positions which carry no valid numbers at all. They are vacated and reserved for new entries when one of the older 'active' numbers semi-retires, and one of the semi-retired ones is vacated. A changeover of this type may be put into effect periodically, say, every two or three weeks. Therefore, it is feasible that a person who does not use the pay token for two months or longer, may find that when re-use is attempted, the pay token is rejected. In that case, the person will be directed to present the pay token to a nearby main office where it may again be validated. (And checked for possible attempt at fraud).

To prevent re-use of a semi-retired test number held in one of the shift registers S21 and S28 the circuit of the control station includes terminals a' to h' connected to bi-stable circuits (not shown) which are set to the required condition by external signals, for example received from a central command station. The state of the bi-stables connected to the terminals a' to h' determines which test numbers are semi-retired. Each terminal is connected with a corresponding gate, represented by AN50 for terminal d', which also receives the corresponding output IV from DB24. If terminal d' is high, monostable M3 is enabled via OR51 (with an input for each of the bi-stables DB21 to DB28) to generate a further shift pulse, causing the bi-stable DB24 and the register S24 to be by-passed during PS5 when, as described above, a new reference signal is being selected for entry into S1.

The circuit of FIG. 2 does not include the means for entering entirely new test numbers, but the connections are shown on the left margin, namely external clock input $CL_{ex}$, Data inputs 1-8, and P/S Enable inputs a to h. It is feasible that in the case of pay phone stations, the modification of the test data along principles just explained, can be performed from a central location by transmitting the requisite data pulses over the telephone lines to the pay phone stations, preferably during night time. Alternatively, in the case of other vending machines, service personnel when visiting the machines, may enter the new numbers by means of a prepared data entry jig.

Returning to the description of the events in subsequent program sections, it will be observed that at the end of program step 6, via OR gate OR 38 and Andgate AN-36 a program pulse PP-7 is passed on to C-21 and C-1. The counter C-3 contains a credit in terms of conversation time (pay pulses) or simply money values. In this example zero value exists when counter C-3 has all the 10 bit outputs at a high level. When in its up-count mode, the counter is debited with every input pulse. In its down-count mode, it is credited, its value is increased.

The purpose of PS-7 is to read out the value content of counter C-3. To this end, clock pulses $\overline{CK}_2$ are applied to counter C-22 via AN33 and to counter C-3 via AN-13, N-13 and OR-13. These pulses will up-count until the 10-way detector gate AN-15 detects that the counter is full. The resulting output sets flip-flop FF-2 which creates a high output from AN-11 which in turn enables AN-10. As a consequence, a continuous train of $\overline{CK}_2$ pulses is fed through $OR_{11}$ to the FIG. 2 circuit. Furthermore, counter C-3 as well as counter C-22 are put into the Down-count mode so that henceforth both counters count down until the detector Nor gate NR-33 detects that all the ten bit outputs have become zero, when the bistable FF-25 is set by a high level S input. This produces a program pulse via gate AN-35 so that PS-8 commences. It should be noted that during the second half of the PS-7 phase the counter C26 is pulsed. It is the first of four BCD counters linked together. Each BCD counter is associated with a four-to-seven line decoder and display unit DP-1 to DP-4. The value of the pay token is therefore displayed on this readout.

During Program Phase 8 the pay token value counter C3 is in readiness to accept debit pulses. In the chosen application, the telephone system generates pay request pulses at intervals inversely proportional to the distance of the called subscriber. Such pulses are applied to the Monostable $M_2$ (right upper corner of FIG. 2A), and a shaped pulse in time slot $\overline{CK}_2$ is produced. With each pay pulse a debit count is added. In the stationary unit, the BCD counter C-26 is now in the down-count mode so that the displayed value visibly diminishes as the telephone conversation goes on.

After the end of the telephone conversation the receiver is replaced causing k-2 and k-3 to close. This produces another program pulse via 'And' gate AN 41. This initiates another readout cycle in the manner already described during PS-9. The readout display however appears now on display elements DP5 to DP8.

The purpose of this second display is to enable the customer (i.e. public phone user) to be assured that the residual value in his pay token is exactly the same as is displayed in the gradually devalued display, DP1 to DP4. It is clear there are alternative solutions using less components by sharing one counter and one display, and using latched decoders and a push button, the latter permitting recall of one or the other latched state. In that way, the customer may again convince himself that there is no difference between the equipment derived value after debiting, and the actual residue value in the pay token. In the event of any difference the customer may go to the nearest bank or post office and have his or her pay token checked and/or report the incident to the operator for attention by the service department. The likelihood of any electronic defect is, however, much smaller than a defect in a coin operated pay phone.

The display would not be extinguished by the termination of the call so as to give the customer a chance to take note of the expense he had incurred. Consecutive phone calls may be made without withdrawing the pay token. There is, however, a Reset Display button operating contactor K-1. Present public pay phones are organised in such a manner that every 'pay request pulse' which comes from the local exchange station must within a brief lapse of time be responded to by a 'paid pulse'. In FIG. 2, this is done by passing the shaped pulse from circuit M-2 over coupling capacitor CC-2 to bistable FF-27 whereby output from NOR gate NR31 rises. On applying a low-going $CK_2$ pulse the terminal D of bistable DB35 goes high in readiness for the next $CK_{22}$ pulse whereupon FF-27 is reset. Accordingly, only one short pulse is applied to OR gate 48. The other OR input 'y' derives from the decoder DC2 which disables the gate when the contents of the display counter is reduced to zero. After that, no further 'paid' pulses can be returned to the equipment and the telephone connection is force-released in the conventional manner.

The question must now be answered as to what happens when the value of the pay token is exhausted. It would not be economical to discard it and obtain a new one. One method would be to hand in the exhausted pay token to a post office counter in exchange for another one having the desired value level which is paid for in cash or by cheque. It may also be possible to provide bank note operated self-service re-charge units in banks, post offices, public transport stations, airports, libraries, super markets. These units would also offer a print out of the transaction as a receipt containing relevant data such as date, code for the individual equipment unit, residual value if any in the pay token, recharge amount received and directly read-out final value of the token, possibly also encoded indications for the test number that was contained in the token which gives a clue to whether it has recently been used, and token data may include a code for the original place of issue of the pay token.

The debiting circuit described in FIG. 2, and which would normally be associated with any vending machine or turnstile etc., does NOT comprise the functions required for recharging the pay token. These functions are associated with program sections 11 to 15 which must of course be provided for in the pay token circuit FIG. 1. They comprise:
a shift register S3,
  containing a test number similar to that provided in shift register S2, but different from any of those earmarked for the initial checking process described above,
a ripple counter C2,
  which counts the number of faulty comparisons of data with those contained in S3.

Otherwise, only a few extra gates are needed to enable the pay token to pass through this very important crediting phase which will now briefly be described.

The register S1 holds three bits for the reference number identifying the test number in shift register S2.

S1 has enough spare capacity to hold also the reference number identifying the test number contained in the shift register S3 now being considered. The crediting phase begins with program section 11. It is evident that, to reach this stage, the crediting operation must successfully pass through all the debiting phases including of course the initial testing phase. At the commencement of PS11, the crediting unit presents to the pay token the test number selected in accordance with the reference number relating to S3 read out during PS-1. The comparison process occurs in gate EX/OR as previously described and as evident from the diagram FIG. 1. In the subsequent program Section (PS-12), and if the comparison was successful and DB4 remains untriggered, the gate AN12 produces an output causing gate NR2 to go low which biases counter C3 for its downcount mode. Any pulse received during PS-12 will therefore augment the credit contents of C3. After receipt of the next programe pulse, PS-13 begins when the routine of replacing the test number which was explained in connection with the description of S2, is being repeated. The reason for exchanging test numbers with each operation is the use of multiple test numbers in the context of 'aging' test numbers which are eventually phased out. It is believed that such a system will provide the integrity and self-repairing property in case of any attempt to fraud.

In PS-14 a final readout of the updated value of the pay token takes place and the data thus transferred to the crediting unit for readout purposes may be applied to a small printout device which issued a receipt.

In PS-15, the supply voltage to the pay token is more than doubled (12 Volt d.c.) for a period of about 15 ms. This is necessary to enable the circuit to memorize its most recent state during the subsequent power shut down, as already explained. If a battery-operated circuit is used, this program step can of course be omitted.

If the clocking frequency is, say, 20 kHz the total duration of the crediting operation would be at most 100 ms. If a lower frequency were used it may be advisable to employ a mechanical latch which holds the token in position for the duration of the crediting cycle, as described above and shown in FIG. 2.

The structure of the pay token circuit FIG. 1 is such that it may also be used for applications where additional data other than value data play a part, for example when used in automatic fare collection on buses etc. In instances like these also other data must be memorized such as entry codes, data and time of starting a journey, a discount percentage that applied to the last value renewal operation, an exit-paid bit, etc. All or any of such additional data may be held in shift register S1 side by side with the test number reference data. They may also be updated in PS-5.

I claim:

1. Data transfer equipment comprising at least one storage station for storing data and at least one control station for interaction with the storage station to alter the stored data, the storage station including memory means for holding a reference signal and a test signal and means for transferring said reference signal to said control station, and the control station including a plurality of addressable memory locations into which different test signals can be entered at different times and selection means responsive to a reference signal from the storage to select a test signal stored by the control station and transfer it to the storage station, means for comparing the transferred test signal with the storage-station test signal and for permitting or inhibiting alteration of said stored data in the storage station in accordance with the results of the comparison, said memory locations including at any one time first and second groups of locations, the control station further including means for enabling a test signal held in one of said first group of memory locations and a reference signal representing the address of said one location to be substituted after said comparison for the test signal and reference signal previously held by the memory means in the storage station.

2. Equipment as claimed in claim 1 in which the control station includes an additional memory location for holding an invalid test signal, means for applying said invalid test signal to the storage station for comparison in place of a valid test signal from one of the first group of locations and means coupled to said comparing means for detecting the result of such comparison.

3. Equipment as claimed in claim 2 in which the control station includes sequencing means coupled to said additional memory location for applying the invalid test signal in sequence with one or more valid test signals.

4. Equipment as claimed in claim 3 in which the control station includes means for switching said sequencing means in the course of each transaction between the control station and the storage station so that the valid and invalid test signals are applied in a different sequence during the next transaction.

5. Equipment as claimed in claim 4 in which said detecting means includes evaluation means for assessing the correctness of the responses of the storage station to both valid and invalid test signals presented in any sequence.

6. Data transfer equipment as claimed in claim 1 in which the storage station includes a first memory for holding the reference signal, a second memory for holding the test signal, comparator means for comparing the test signal in the second memory with a test signal transferred from the control station, a first register for holding the stored data and a first means coupled to said first memory, said second memory, said comparator means and said first register for programming data transfer between the control station and the storage station.

7. Data transfer equipment as claimed in claim 6 in which the control station includes a first memory for operation in association with the first memory of the storage station, a first register for operation in association with the first register of the storage station, and a second register for programming data transfer operations, said second register being connected for operation in synchronism with the second register of the storage station.

8. Equipment as claimed in claim 1 in which the storage station is in the form of a portable data carrier inductively coupled to the control station.

9. Equipment as claimed in claim 8 in which the memory means in the storage station comprise nonvolatile memory devices.

10. Equipment as claimed in claim 1 further including means for selectively altering the test signal stored in any of said first addressable memory locations so that different valued test signals can be employed for said comparison and substituted in the storage station memory means.

11. Data transfer equipment comprising at least one storage station for storing data and at least one control station for interaction with the storage station to alter the stored data, the storage station including memory means for holding a reference signal and a test signal and means for transferring said reference signal to said control station, and the control station including at least two memory locations in which different test signals are held and selection means responsive to a reference signal from the storage station to select a test signal held by the control station and transfer it to the storage station, means for comparing the transferred test signal with the storage-station test signal and for permitting or inhibiting alteration of the stored data in the storage station in accordance with the results of the comparison, the control station including means coupled to said selection means for presenting the two test signals to the storage station in an unpredictable sequence for comparison with the storage-station test signal, the storage station including means for generating different responses to comparison of the storage-station test signal with a similar and a dis-similar test signal, and the control station including evaluating means for determining whether these responses are obtained in the correct sequence or the response is defective.

12. Equipment as claimed in claim 11 in which the control station includes means for switching said presenting means in the course of each transaction between the control station and the storage station in order to change the sequence of test signals presented to the storage station during the next transaction.

13. Equipment as claimed in claim 11 in which one of said memory locations holds at all times an invalid test signal, dis-similar to any test signals which can be entered in the storage station.

14. Equipment as claimed in claim 11 wherein the response-generating means of the storage station only transmits the responses to the evaluating means of the control station after completion of the sequence of comparisons.

15. Equipment as claimed in claim 11 further including means for selectively altering the test signal stored in at least one of said two memory locations so that different test signals can be used for the comparison.

16. A data storage station comprising:
data storage means for variable data;
memory means for storing an internal reference signal and an internal test signal, said internal reference signal corresponding to said internal test signal;
coupling means coupled to said data storage means and said memory means for providing said internal reference signal externally of said data storage station and for sensing externally generated reference signals, test signals and control signals;
control means coupled to said coupling means and said data storage means for generating internal clock signals and internal state signals from said externally generated control signals,
said coupling means being enabled to provide said internal reference signal by the generation selected one of said internal clock signals and internal state signals; and
comparison means coupled to said control means, said memory means and said coupling means for comparing said internal test signal with an external test signal generated in response to the external provision of said internal reference signal and sensed by said coupling means and for generating a compare signal specifying whether said internal test signal and said external test signal agree or disagree, said coupling means including means for providing said compare signal externally of said data storage station,
said coupling means further including means responsive to receipt of an external generated new reference signal and new test signal after said comparison means has generated a valid compare signal specifying an agreement between the original internal test signal and the formerly sensed external test signal for storing said new reference signal and said new test signal in said memory means.
said control means normally inhibiting alteration of said variable data in said data storage means until the generation of said valid compare signal and including means for permitting alteration of said variable data thereafter.

17. The invention of claim 16 wherein said memory means includes means for storing a second internal reference signal and a second internal test signal,
said control means includes means enabling said coupling means to provide said second internal reference signal after said valid compare signal has been generated,
said comparison means includes means for comparing said second internal test signal with a second external test signal generated in response to the external provision of said second internal reference signal and sensed by said coupling means and for generating a second compare signal specifying whether said second internal test signal and said second external test signal agree or disagree,
said coupling means including means for providing said second compare signal externally of said data storage station,
said coupling means further including means responsive to the receipt of an externally generated new second test signal after said comparison means has generated a second valid compare signal specifying an agreement between the original second internal test signal and the formerly sensed second external test signal for storing said new second test signal in said memory means,
said control means including means for enabling value data to be augmented in said data storage means after the generating of said second valid compare signal.

18. A data token comprising:
memory means for storing an internal reference signal and an internal test signal, said internal reference signal corresponding to said internal test signal;
coupling means coupled to said memory means for providing said internal reference signal externally of said data token and for sensing externally generated reference signals, test signals, and control signals;
control means coupled to said coupling means and said memory means for generating internal clock signals and internal state signals from said externally generated control signals,
said coupling means being enabled to provide said internal reference signal by the generation of selected ones of said internal clock signals and internal state signals; and
comparison means coupled to said control means, said memory means and said coupling means for comparing said internal test signal with an external test signal generated in response to the external manifestation of said internal reference signal and sensed by said coupling means and for generating a compare signal specifying whether said internal test signal and said external test signal agree or disagree, said coupling means including means for providing said compare signal externally of said data storage station, said coupling means further including means responsive to the receipt of an externally generated new reference signal and new test signal after said comparison means has generated a valid compare signal specifying an agreement between the original internal test signal and the formerly sensed external test signal for storing said new reference signal and said new test signal in said memory means.

19. The invention of claim 18 wherein said memory means include means for storing a second internal reference signal and a second internal test signal, said control means includes means for enabling said coupling means to manifest said second internal reference signal after said valid compare signal has been generated, said comparison means includes means for comparing said second internal test signal with a second external test signal generated in response to the external provision of said second internal reference signal and sensed by said coupling means and generating a second compare signal specifying whether said second internal test signal and said second external test signal agree or disagree, said coupling means including means for providing said second compare signal externally of said data storage station, said coupling means further including means responsive to the receipt of an externally generated new second test signal after said comparison means has generated a second valid compare signal specifying an agreement between the original second internal test signal and the formerly sensed second external test signal for storing said new second test signal in said memory means.

20. A control station comprising:

memory means for storing a plurality of individual control station reference signals and a plurality of control station test signals corresponding to said individual control station reference signals;

control means for generating control station control signals;

coupling means coupled to said memory means, said generating means and said control means for providing said reference, test and control signals externally of said control station and for sensing externally generated reference signals and test compare signals; and accessing means coupled to said memory means and said coupling means responsive to the sensing of an externally generated reference signal for accessing from said memory means to said coupling means a control station test signal corresponding to said externally generated reference signal when said externally generated reference signal matches one of said individual control station reference signals, said access means further including means responsive to the sensing of a subsequent externally generated test compare signal for accessing from said memory means to said coupling means a new reference signal and a new test signal for provision externally of said control station.

21. The invention of claim 20 wherein said control station further includes means coupled to said control means, said accessing means, and said coupling means for randomly disabling said accessing means for accessing said corresponding control station test signal to said coupling means and for furnishing to said coupling means an invalid test signal different from said corresponding control station test signal.

22. The invention of claim 20 wherein said control station further includes means for selectively disabling said accessing means from accessing certain ones of said individual control station test signals from said memory means.

* * * * *

UNITED STATES PATENT AND TRADEMARK OFFICE
CERTIFICATE OF CORRECTION

PATENT NO. : 4,499,556
DATED : Feb. 12, 1985
INVENTOR(S) : John W. Halpern

It is certified that error appears in the above-identified patent and that said Letters Patent is hereby corrected as shown below:

On the title page the following should be added:

--[73] Assignee: Paperless Accounting, Inc.
Washington, D. C. --.

Signed and Sealed this

Fifth Day of November 1985

[SEAL]

Attest:

DONALD J. QUIGG

Attesting Officer

Commissioner of Patents and Trademarks